United States Patent [19]

Carstens et al.

[11] 4,165,845
[45] Aug. 28, 1979

[54] METHOD AND APPARATUS FOR PROCESSING VEHICLES MOVING THROUGH A CONDUIT BY AIR

[75] Inventors: Marion R. Carstens, Atlanta; Homer J. Bates, Roswell, both of Ga.

[73] Assignee: Georgia Tech Research Institute, Atlanta, Ga.

[21] Appl. No.: 894,108

[22] Filed: Apr. 6, 1978

[51] Int. Cl.² .................................................. B65G 51/22
[52] U.S. Cl. ..................................... 406/192; 104/253
[58] Field of Search .................................. 243/19–28, 243/38; 104/138 R, 155, 252, 253; 193/35 A, 40, 32; 221/289

[56] References Cited

U.S. PATENT DOCUMENTS 3,104,078   9/1963   Buchwald et al. ..................... 243/19

FOREIGN PATENT DOCUMENTS 2337370   2/1975   Fed. Rep. of Germany ............. 243/38

Primary Examiner—Robert B. Reeves
Assistant Examiner—James L. Rowland
Attorney, Agent, or Firm—Newton, Hopkins & Ormsby

[57] ABSTRACT

A method and apparatus for processing vehicles which are moved through a conduit by air through sequential zones one, two and three. Preferably, the zones are inclined downwardly towards downstream for aiding movement of the vehicles downstream by gravity. Zone one is a storage zone which preferably has vents adjacent its upstream end and its downstream end for controlling the speed of movement of vehicles into zone one and from zone one to zone two. Zone two is the processing zone which receives vehicles from zone one and releases the vehicles to zone three. Zone two includes an air blocking vehicle stop at its downstream end against which a first vehicle is held, and includes a holding arm which holds a second vehicle while the leading first vehicle is released. The first vehicle is released to zone three, but only when three is clear of vehicles and a second vehicle is positioned behind the first vehicle. Thereafter, the second vehicle is released and moves to the downstream end of zone two and becomes the leading vehicle for continuing the cycle. Additional vehicles moving through the conduit are decelerated in zones one and two with the aid of air trapped behind the air blocking vehicle stop and/or parked vehicles. An accelerator may be provided in zone two for providing a rapid start of the leading vehicle from zone two into zone three. Vehicle position sensors are positioned in the various zones for sensing the presence of vehicles and controlling the movement of the vehicles through the conduit.

19 Claims, 6 Drawing Figures

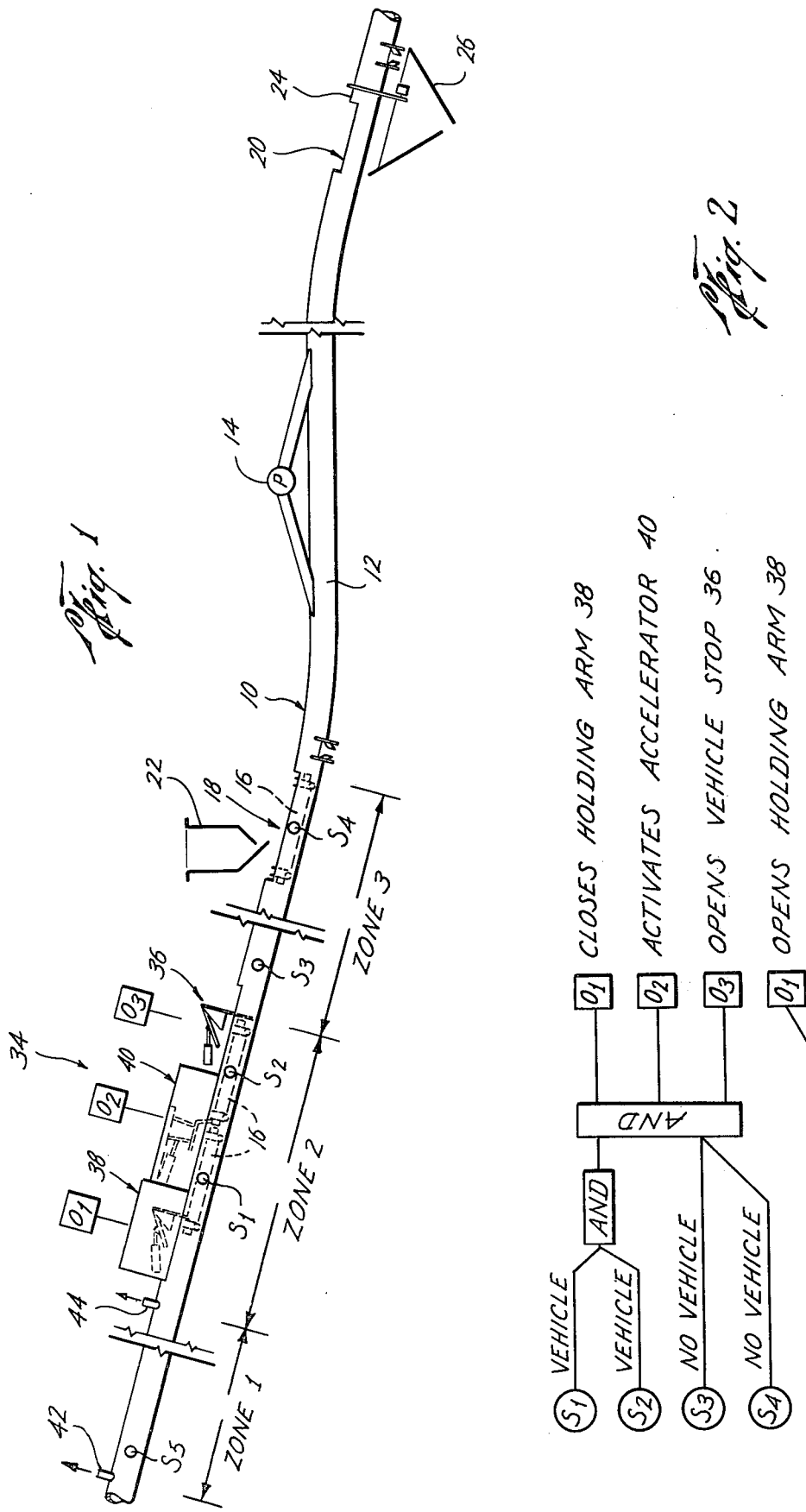

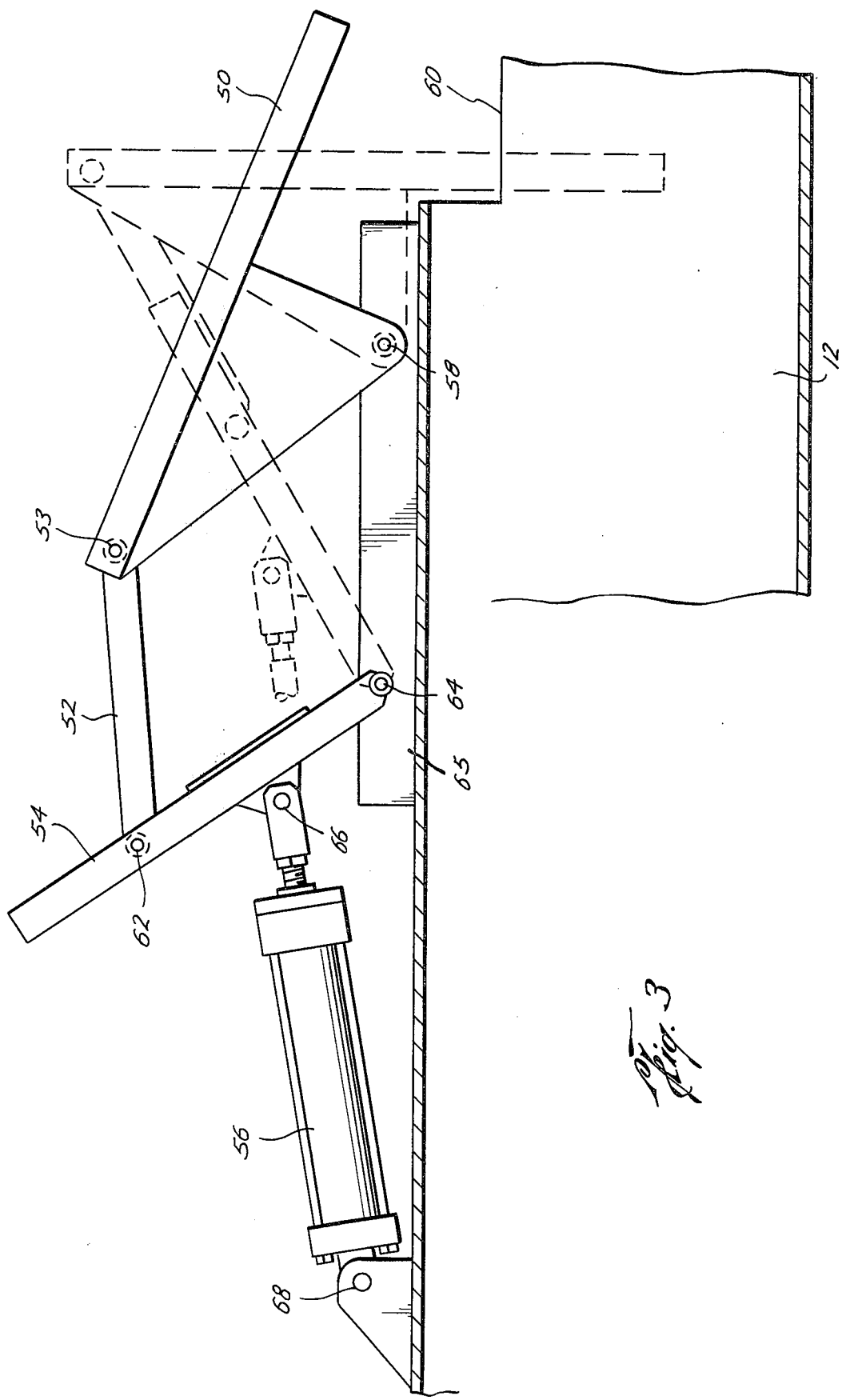

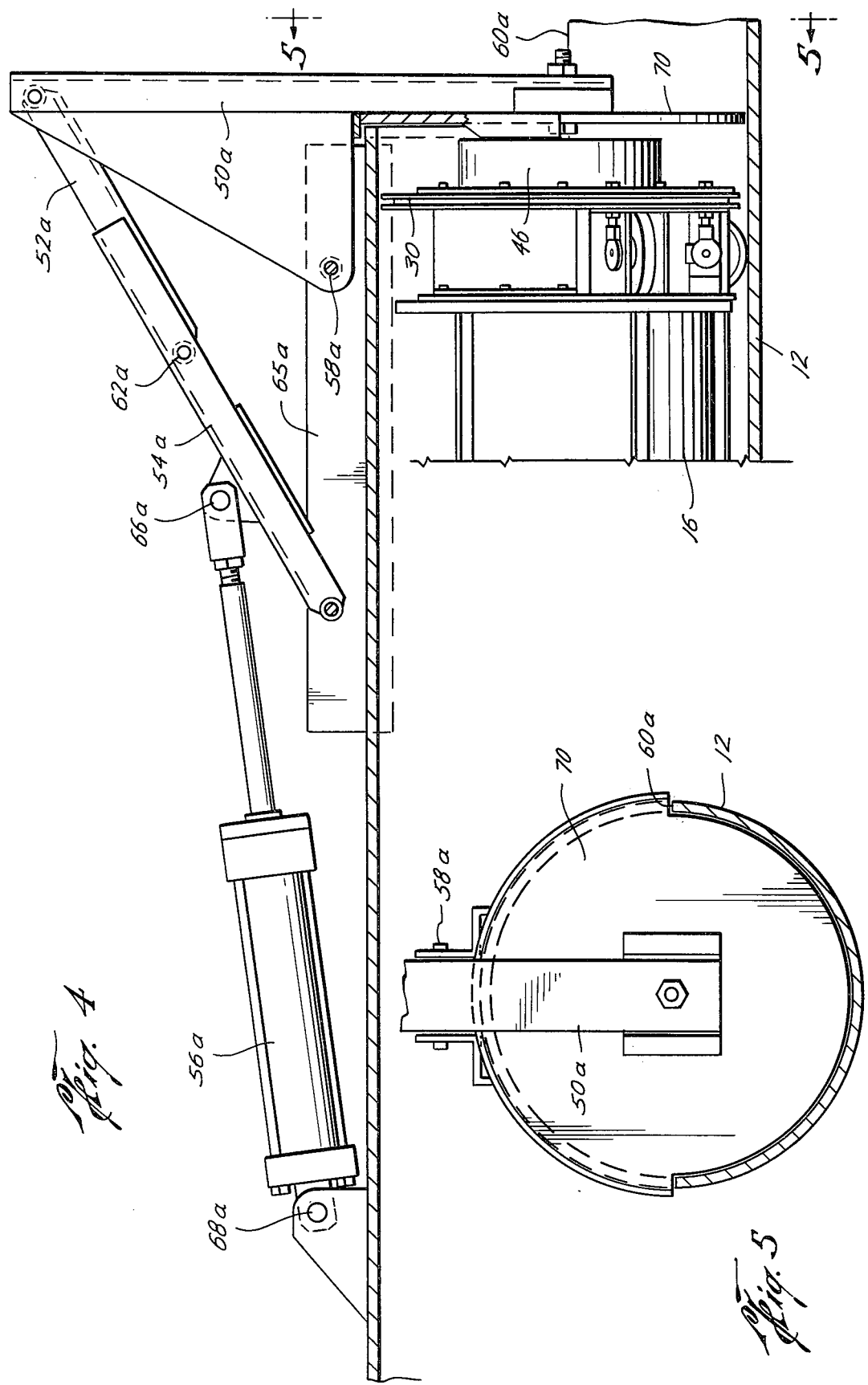

METHOD AND APPARATUS FOR PROCESSING VEHICLES MOVING THROUGH A CONDUIT BY AIR

BACKGROUND OF THE INVENTION

The movement of load carrying vehicles through a conduit by air has been proposed in the past. However, in order to obtain maximum efficiency for such a system, the vehicles must be collected, stored, processed and released into the conduit at appropriate times and in accordance with certain operating parameters. It is desirable that a vehicle processing zone be located upstram from each operational unit such as a vehicle loader and vehicle unloader and since operational times may vary and even the speed of vehicles moving through the conduit are not uniform, it is important that the movement of the vehicles be carefully controlled.

The present invention is directed to various improvements in a method of and an apparatus for temporarily storing and processing of vehicles moving through a conduit by air and insures the proper control and release of a vehicle to an operating zone when certain operating parameters are met.

SUMMARY

The present invention is directed to a method for and an apparatus for processing vehicles which are moved through a conduit by air through sequential zones one, two and three in which the zones are preferably inclined downwardly towards downstream for aiding the movement of vehicles downstream by gravity. Any incoming vehicles are decelerated, collected, separated and released when operating conditions dictate. The first incoming vehicle is stopped at the downstream end of the processing zone two by inserting an air blocking vehicle stop into the conduit in the downstream end of zone two thereby providing a dead-end air stop which decelerates the first vehicle by compressing the air between the vehicle and the vehicle stop as well as providing a positive holding stop. Thereafter a second vehicle is stopped in zone two against the rear of the first vehicle with the aid of air trapped behind the air blocking vehicle stop and the first vehicle. Thereafter, the first vehicle is released fron zone two to enter the operating zone three, but only when zone three is clear of vehicles and a second vehicle is positioned behind the first vehicle. This is accomplished by retracting the vehicle stop from the front of the first vehicle and moving a vehicle holding arm into te conduit in zone two for holding the second vehicle in position while the first vehicle is released. The requirement of a second vehicle being in position before the first vehicle is released insures that the second vehicle acts as a temporary air block and stopping gate against which further incoming trains can decelerate even while the air blocking vehicle stop is open. Thereafter, the holding arm is released, the air blocking vehicle stop is moved back into the conduit and the second vehicle moves to the downstream end of zone two to become the leading vehicle and to repeat the cycle.

Yet a still further object of the present invention is the provision of an air exhaust from the upstream end of the storage zone one which vents air whereby vehicles moving through zone one and two are slowed down by the aerodynamic drag of the air flowing back past a rolling vehicle. In addition, a second air exhaust vent may be provided at the downstream end of zone one whereby a better force balance can be obtained for allowing the incoming vehicle to be moved positively into the line of stationary vehicles without severe impact.

Yet a still further object of the present invention is the provision of an accelerator in zone two for providing a rapid positive start of a stationary vehicle being released from zone two.

Yet a still further object of the present invention is the provision of vehicle sensing means positioned in zones two and three for sensing the presence or absence of two vehicles in zone two and vehicles in zone three for controlling the actuation of the vehicle stop, the vehicle holding arm and the accelerator. In addition, a vehicle position sensing means may be positioned in zone one downstream of the upstream air vent for controlling the maximum number of vehicles present in the storage zone one.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is an elevational view, partly schematic, and partially fragmentary, illustrating the use of the present invention in a transportation system in which load carrying vehicles move through a conduit by air, FIG. 2 is a logic diagram illustrating the actuation of various components of the present invention in response to vehicle sensors detecting the presence or absence of vehicles at certain locations, FIG. 3 is an enlarged elevational view illustrating the construction of one type of vehicle holding arm which may be used in the present invention, FIG. 4 is an enlarged elevational view of one type of air blocking vehicle stop that may be used in the present invention, FIG. 5 is a cross-sectional view taken along the line 5—5 of FIG. 4.

DESCRIPTION OF THE PREFERRED EMBODIMENT

Figure 6:
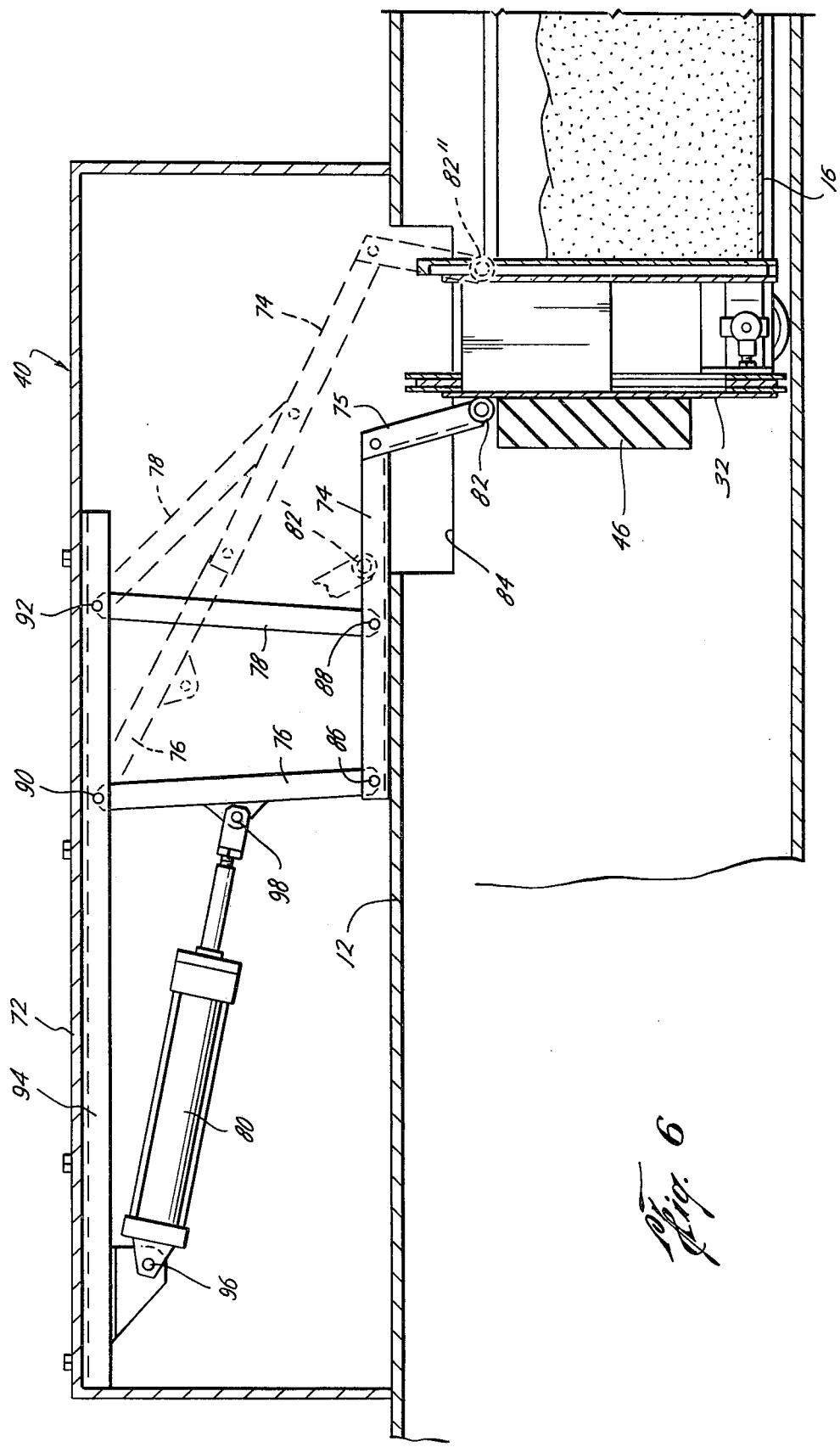
FIG. 6 is an enlarged elevational view of one type of accelerator that may be used in the present invention.

Referring now to the drawings, and particularly to FIG. 1, the present invention may be used in any suitable air actuated conduit transportation system having wheeled vehicles, and for purposes of illustration only, is referred to generally by the reference numeral 10 and includes a tubular conduit or pipeline 12 having one or more suitable pumps 14 for creating a flow of air through the pipeline 12 for moving wheeled vehicles 16 therethrough. Normally, such vehicle transportation system 10 generally includes various operational functions such as including a loading station generally indicated by the reference numeral 18 and an unloading station generally represented by the reference numeral 20. Such systems 10 are suitable for carrying various types of loads, such as particulate solids, and the loading station 18 may nclude a hopper 22 for filling a vehicle 16 positioned in the loading station 18. The unloading station 20 may include unloading means 24, such as described more fully in U.S. Pat. No. 3,724,690 for receiving a vehicle, inverting the vehicle, and dumping the transported material to a receiver 26 and then righting the emptied vehicle.

The vehicle 16 may be any suitable type of car or a plurality of cars forming a train which has a cross-sectional area similar in shape and size but slightly smaller than the interior of the conduit 12 such as a vehicle 16, the front end of which is shown in FIG. 4 and the rear end of which is shown in FIG. 6. The vehicle 16 includes one or more plates 30 and 32, such as at the forward and/or rearward ends of the vehicle 16, on which the air moving through the pipeline 12 acts to push the vehicle 16 through the conduit 12.

However, in order to have an economical transportation system, it is necessary that the vehicles 16 be processed through the system 10 efficiently. This requires collecting, stopping, and dispatching vehicles 16 in a periodic manner while being subjected to certain operating conditions which exist and may be variable in the system 10. The present invention is directed to a method of and an apparatus for processing vehicles moving through the transportation system 10 and the processing system indicated by the numeral 34 of the present invention generally includes a first zone 1 for collecting and temporarily storing excess vehicles 16, a second processing zone 2 for positioning and releasing individual vehicles 16 in a desired sequence regardless of whether the vehicles 16 arrive singularly or in bunches in the system 34, and a third zone 3 which is the operating zone.

The processing zone 2 is a space in the conduit 12 for two vehicles 16 and generally includes an air blocking vehicle stop 36 at the downstream end of zone 2 and a vehicle holding arm 38, both of which will be more fully described hereinafter. The air blocking vehicle stop 36 is movable into and out of the conduit 12 to provide a dead-end air stop which decelerates incoming vehicles into zones 1 and 2 as well as providing a stop barrier to prevent the forward movement of a vehicle 16 when the stop 36 is in the closed position. The holding arm 38 is generally movable into and out of the conduit 12 for holding a second vehicle 16 in position when the leading of first vehicle 16 is being released from zone 2 to zone 3. That is, when a first vehicle 16 arrives in zone 2 it decelerates by compressing the air between the closed vehicle stop 36 and the end plates 30 and 32 on the vehicle 16 and thereafter the first vehicle 16 rests against the back side of closed stop 36. A second vehicle 16 entering zone 2 will decelerate by compressing the air between its plates 30 and 32 and the rear end of the first vehicle 16 as well as the air trapped behind the stop 36 and the second vehicle 16 rolls to a stop against the rear of the first vehicle 16.

While the air locking stop 36 and the vehicle holding arm 38 generally work simultaneously, they work alternately to each other. That is, when the stop 36 is moved into the conduit 12, the holding arm 38 is moved out of the conduit 12, and vice versa. A control system which will be more fully described hereinafter will not release the first vehicle resting against the stop 36 into the operating zone 3 until the following conditions are met: (1) the downstream operating zone 3 must be clear of vehicles, and (2) a second vehicle 16 must be positioned in zone 2 directly behind the first vehicle which rests against the stop 36. When these two conditions are satisfied, the stop 36 will open releasing the first vehicle into the operating zone 3 downstream of the stop 36 and simultaneously the holding arm 38 will move into the conduit 12 holding the second vehicle 16 in position as long as the stop 36 is open. The present apparatus and method insures that only individual vehicles 16 are released regardless of whether the vehicles arrive into the processing system 34 singularly or in bunches, and the holding of a second vehicle 16 by the holding arm 38 provides an air block which acts as a temporary stopping gate against which further incoming vehicles 16 can decelerate even though the air blocking vehicle stop 36 is open.

After the first or leading vehicle 16 is released to zone 3, the stop 36 closes and the holding arm 38 releases the second vehicle 16, and the second vehicle 16 now moves up against and rests against the back of the stop 36 and becomes the leading vehicle in the next continuing cycle of operation. Thereafter another incoming vehicle 16 from zone 1 will roll down, decelerate and stop at the rear end of the now leading vehicle and will rest in zone 2 beneath the holding arm 38.

Because zones 1, 2 and 3 are inclined downwardly, vehicles 16 will automatically roll downwardly sequentially through the zones unless restrained. However, on releasing a leading vehicle 16 from behind the stop 36 into zone 3, a mechanical accelerator 40 may be provided to give a rapid positive start to the stationary vehicle 16 being released from zone 2 to zone 3 by the stop 36.

Zone 1 is an enclosed portion of conduit 12 which extends upstream from zone 2 and includes a primary vent 42 which exhausts pressurized air from the upstream portion of conduit 12. Vehicles 16 moving through zone 1 are slowed down by the aerodynamic drag or air which must flow back past a rolling vehicle 16 and out vent 42. The force propelling the vehicles 16 into zone 1 include the gravity force component and the pressure force acting on the vehicles 16 by pumps similar to pump 14 which propel the vehicles 16 through the conduit 12. In addition to vent 42, a second vent 44 may be provided adjacent the downstream end of zone 1. By throttling the vents 42 and 44 a pressure balance can be obtained so that incoming vehicles 16 are moved positively into the line of stationary vehicles without severe impact. Inasmuch as impact is not entirely eliminated, bumpers such as bumpers 46 (FIGS. 4 and 6) are installed on the ends of the vehicles 16. The exhaust of air from vents 42 and 44 is adjusted to obtain a force balance which insures that one vehicle 16 is moved forward in zone 1 and that one vehicle 16 is moved from zone 1 to zone 2 after the stop 36 is closed. For example, if the processing system 34 is designed for a minimum released period of thirty seconds, then the recharging of zone 2 should be accomplished in less than thirty seconds, say twenty-five seconds. The time to recharge zone 2 can be decreased by increasing the throttling at vent 42 and decreasing the throttling at vent 44 in zone 1. The time for recharge of zone 2 should be adjusted to be only slightly smaller than the designed release period of the processing unit 34 in order to minimize the impact forces between adjacent vehicle 16 and between the vehicle 16 and the holding arm 38.

A series of vehicle position sensing means are provided for detecting the presence or absence of vehicles 16 at predetermined locations for controlling the actuation of the vehicle stop 36, holding arm 38, and accelerator 40. Any suitable type of sensor such as photocells, sonic, mechanical or magnetic sensors may be utilized. The preferred sensors are photocell sensors such as microswitch models FE-MLS 7 A and G4B in conjunction with a scanner model FE-MLS 7 A. Thus, a sensor S1 is positioned in zone 2 in the conduit 12 for measuring a presence of a second vehicle in zone 2, a sensor S2 is connected in zone 2 measuring the presence of a first vehicle positioned behind the stop 36, a sensor S3 is positioned in zone 3 for detecting the presence of or the passage of a vehicle 16 through zone 3, sensor S4 is positioned at the loader 18 to detect the presence of a vehicle 16 therein, and sensor S5 is located downstream of the vent 42 for detecting when the maximum number of vehicles 16 is collected in the processing system 34. The sensors control the actuation of suitable operators, which may be mechanical, hydraulic, electric or pneumatic operators for the stop 36, arm 38, and accelerator 40 such as operators 03, 01 and 02, respectively. Referring now to FIG. 2, a logic diagram is provided illustrating the control of the processing system 34 by the various sensors. In order to actuate the system 34, for one cycle, the sensors S1 and S2 must detect the presence of a vehicle and sensors S3 and S4 must detect the absence of a vehicle. When these conditions, exist, operator 01 is actuated to move the holding arm 38 into the conduit 12 to restrain any forward movement of the second vehicle in zone 2, operator 03 is actuated opening the vehicle stop 36, and 02 is actuated to cause accelerator 40 to move the first vehicle out of zone 2 into zone 3 and retract. The release of the leading vehicle 16 from zone 2 will cause sensor S3 to detect its passage which then retracts the holding arm 38 and closes the vehicle stop 36 thereby moving the second vehicle in zone 2 to the leading position in zone 2 and allows the movement of a further vehicle in zone 1 to move into the second vehicle position in zone 2 to complete the cycle.

While any suitable holding arm mechanism 38 may be provided, one suitable type is illustrated in FIG. 3 which is encased in an air tight enclosure (FIG. 1) and provides a sturdy barrier which penetrates into an opening 60 in the top of the conduit 12 to restrain a second vehicle in zone 2 when the leading vehicle in zone 2 is being released. The holding arm assembly 38 generally includes an arm 50, first lever 52, a second lever 54, and an actuating means, such as a pneumatic piston and cylinder assembly 56. The arm 50 is pivotally supported about pivot 58 for movement of the arm 50 into a holding position, as indicated in the dotted outline through an opening 60 in the conduit 12. The arm 50 projects far enough down into the conduit 12 cross section to be below the top of the end plates 30 and 32 of the vehicle 16 for holding the vehicle 16 in a restrained position. When the arm 50 is moved to the open position, as shown in solid outline, the arm 50 is moved out of the path of movement of a vehicle 16 in the conduit 12, thereby allowing the vehicle 16 to move through the conduit 12. The first lever 52 and the second lever 54 are pivotally connected together by a first pivot connection 62. The first lever 52 is also pivotally connected by a second pivot connection 53 to the arm 50. The second lever 54 is pivotally connected by a third pivot connection 64 to a support 65 secured to the conduit 12. The actuating means 56 is pivotally connected to one of the levers such as 54 by pivot connection 66 and is connected by a pivot connection 68 to the support 65. When the assembly 56 is in the expanded position, as shown in dotted outline, arm 54 is rotated about pivot connection 64 and in turn rotates arm 52 about pivot connection 62 into an extended position, and in turn rotates the arm 50 about pivot 58 into the holding position. Retraction of the assembly 55 withdraws the arm 50 from the opening 60.

Preferably, arm stop means are provided for aligning the pivot connection 62 substantially in line between the pivot connections 64 and 53, or slightly past a dead center position, whereby the impact of any vehicle 16 against the arm 50 will be transmitted through the arms 52 and 54 to the support 65 instead of to the assembly 56. Thus, the arms 52 and 54 may be channel-shaped in cross section and thus provide coacting stop shoulders to stop the arms in the expanded position at best seen in dotted outline.

The air blocking vehicle stop 36 (FIG. 4) may be of any suitable mechanism. In fact, the stop 36 may be similar to the holding arms 38 but includes a generally circular disc 70 which is swung into and out of the conduit 12 through an opening 60a. The stop 70 in the closed position is a sturdy barrier to prevent the forward movement of the vehicle 16 and is a closed valve to prevent air flow therethrough. For convenience, the like parts of the air blocking vehicle valve 36 are numbered similarly to the holding arm 38 of FIG. 3 with the addition of the suffix "a". Its operation into the closing and opening position is identical to the operation of the holding arm 38. For a fuller disclosure of the structure and operation of the holding arm 38 and vehicle stop 38, reference is made to copending application Ser. No. 744,616 now U.S. Pat. No. 4,108,079.

If desired, the accelerator 34 may be utilized to provide a positive rapid start of a vehicle 16 at rest behind the vehicle stop 36. While any suitable accelerator may be used, one such as shown in FIG. 6, which is encased in an air tight enclosure 72 may be utilized which pushes forward on a portion of the vehicle 16 and retracts after pushing the newly released vehicle 16. The accelerator 34 generally includes a pushing arm 74 having a pivotally connected member 75, a first lever 76, a second lever 78, and an actuating means, such as a pneumatic piston and cylinder assembly 80. Initially, the outer end 82 of the pushing arm 74 is retracted out of the conduit 12 in the position 82'. Upon actuation of the actuating means 80, the outer end 82 of the pushing arm 74 moves downwardly into an opening 84 in the conduit 12 and contacts the vehicle 16, for example, at the rear and continues to move in the downstream direction to a position indicated by the numer 82" to provide a positive push on the vehicle 16 to give it a rapid start into zone 3. After the accelerator 34 pushes a vehicle 16 forward, the pushing arm 74 is quickly and automatically retracted out of the opening 84 to allow the movement of another vehicle 16 into the leading position in zone 2. The pivoted member 75 will pivot out of the way of any obstruction vehicle. One end of each of the levers 76 and 78 is pivotally connected to the pushing arm 74 by pivots 86 and 88, and the second end of the lever arms 76 and 78 is pivotally connected by pivots 90 and 92 to a support 94. The actuating means 80 is pivotally connected to the support 94 by a pivot 96 and is pivotally connected by pivot 98 to lever 76. The accelerator 34 is shown in a partially extended position in full outline pushing the vehicle 16, and is shown in a fully extended position in dotted outline.

In use, the processing system 34 provides a region of temporary storage for vehicles 16 and processes the vehicles 16 by moving them forward into the operating zone 3 when zone 3 is ready. That is, when a first vehicle 16 arrives in the processing zone 34, the vehicle stop 36 is in the closed position, as shown in FIG. 4, and the holding arm 38 and the accelerator 34 are in the retracted position out of the conduit 12. The incoming first vehicle 16 decelerates by compressing the air between the vehicle 16 and the plate 70 of the vehicle stop 36. The first vehicle 16 comes to rest against the back side of the plate 70, and the control system, illustrated in FIG. 2, will not release the first vehicle 16 into the operating zone 3 downstream of the vehicle stop 36 until the following conditions are met: (1) the downstream operating zone 3 must be clear of vehicles, and (2) a second vehicle 16 must be in zone 2 directly behind the first vehicle 16. Therefore, a release will not be performed until a second vehicle 16 enters the processing system 34, decelerates by compressing the air between the second vehicle 16 and the first vehicle 16 and vehicle stop 34, and rolls to a stop against the rear of the first vehicle 16. At this time, assuming that both of the above-named conditions are satisfied, the vehicle stop 36 will open releasing the first vehicle into the operating zone 3 and simultaneously the holding arm 38 will move downwardly into the conduit 12 into the position shown in dotted outline in FIG. 3 and holds the second vehicle 16 in position as long as the vehicle stop 36 is open. Also simultaneously with the opening of the vehicle stop 36 and closing of the holding arm 38, the accelerator 34 gives a positive push to the first vehicle in order to insure a fast start into zone 3. These operating conditions are met only when sensors S1 and S2 detect the presence of a vehicle at their locations and sensors S3 and S4 indicate the absence of vehicles at their locations.

The accelerator 40 provides not only a positive push on the leading vehicle 16, but also immediately thereafter retracts back up into its housing 72 and out of the conduit 12. After the first vehicle clears the vehicle stop 36 and actuates and deactuates sensor S3, the vehicle stop 36 moves back into the conduit 12 into the closed position, and simultaneously the holding arm 38 is retracted from the conduit 12 releasing the second vehicle 16 which now rolls down against the back of the vehicle stop 36 and becomes the lead vehicle 16 in the next cycle. The requirement for having two vehicles 16 in zone 2 before releasing a lead vehicle 16 to the operating zone 3 insures that a single vehicle or train 16 is released, regardless of whether the vehicles arrive in the system 34 singularly or in bunches, and insures that a second vehicle is in place which acts as a temporary air-stopping gate against which incoming trains can decelerate even though the air blocking vehicle stop 36 is open.

The storage zone 1, not only serves as a parking area for trains in line to be processed through zone 2, but serves as a zone in which the vehicles, being ejected from the pressurized conduit 12, are decelerated to a smooth stop at the tail end of any other parked vehicles. Smooth deceleration occurs naturally because any air trapped between a vehicle entering zone 1 and any parked vehicles in zone 1 and zone 2 is forced to flow back past the moving vehicle and out a vent generating a braking force on the incoming vehicle.

The method of processing vehicles through the conduit 12 is apparent from the foregoing description of a presently preferred embodiment of the apparatus and the method contemplates the processing vehicle which are moved through a conduit by air through sequential zones 1, 2 and 3 by stopping a first vehicle at the downstream end of zone 2 by inserting an air blocking vehicle stop into the downstream end of zone 2, thereafter stopping a second vehicle in zone 2 against the rear of the first vehicle with the aid of air trapped in the conduit behind the vehicle stop and the first vehicle, and thereafter allowing the first vehicle to enter zone 3, but only when zone 3 is clear of vehicles and the second vehicle is positioned behind the first vehicle, by retracting the vehicle stop from the front of the first vehicle and holding the second vehicle in position, and thereafter releasing the second vehicle and reinserting the air blocking vehicle stop into the conduit, and moving the second vehicle to the downstream end of zone 2. The method further includes, after stopping a second vehicle in zone 2 against the rear of the first vehicle, of stopping any additional vehicles moving through the conduit in zone 1 with the aid of air trapped behind the second vehicle. The method further comprehends the step of moving the first vehicle from zone 2 into zone 3 with the aid of an accelerator pushing the first vehicle out of zone 2, and aiding the movement of vehicles through zones 1, 2 and 3 by inclining the zones 1, 2 and 3 downwardly towards downstream. The method further comprehends controlling the movement of vehicle zones 1 and 2 by exhausting air from the conduit adjacent zone 1.

The present invention, therefore, is well adapted to carry out the objects and attain the ends and advantages mentioned as well as others inherent therein. While a presently preferred embodiment of the invention is given for the purpose of disclosure, numerous changes in the details of construction, arrangement of parts and steps of the process, will be readily apparent to those skilled in the art and which are encompassed within the spirit of the invention and the scope of the appended claims.

What is claimed is:

1. A method for processing vehicles which are moved through a conduit by air through sequential zones one, two and three comprising,
    stopping a first vehicle at the downstream end of zone two by inserting an air blocking vehicle stop into the downstream end of zone two,
    thereafter stopping a second vehicle in zone two adjacent the rear of the first vehicle with the aid of air trapped behind the first vehicle,
    allowing the first vehicle to enter zone three, but only when zone three is clear of vehicles and the second vehicle is positioned behind the first vehicle, by retracting the vehicle stop from the front of the first vehicle and holding the second vehicle in position,
    thereafter releasing the second vehicle and reinserting the air blocking vehicle stop into the conduit and moving the second vehicle to the downstream end of zone two.

2. The method of claim 1 including after stopping a second vehicle in zone two adjacent the rear of the first vehicle, the stop of,
    stopping any additional vehicles moving through the conduit in zone one with the aid of air trapped behind the second vehicle.

3. The method of claim 1 including the step of moving the first vehicle from zone two into zone three by the step of actuating an accelerator to push the first vehicle out of zone two.

4. The method of claim 1 including the step of aiding the movement of vehicles through zones one, two and three by inclining the zones one, two and three downwardly towards downstream.

5. The method of claim 1 including exhausting air from the conduit adjacent zone one for controlling the movement of vehicles through zones one and two.

6. The method of claim 1 including exhausting air from the conduit adjacent both the upstream end and the downstream end of zone one for controlling the time of movement of vehicles from zone one into zone two.

7. A method of processing load carrying vehicles which are moved through a conduit by air comprising,
providing zones one, two and three in the conduit sequentially in the conduit from an upstream portion to a downstream portion of the conduit, said zones being inclined downwardly towards the downstream for aiding the movement of vehicles downstream by gravity,
stopping a first vehicle at the downstream end of zone two by inserting an air blocking vehicle stop into the downstream end of zone two thereby providing a dead-end air stop and blocking stop,
thereafter stopping a second vehicle in zone two adjacent the rear of the first vehicle with the air of air trapped behind the air blocking vehicle stop and the first vehicle,
stopping any additional vehicles moving through the conduit in zone one with the aid of air trapped behind the air blocking vehicle stop and/or said first and second vehicles,
allowing the first vehicle to enter zone three, but only when zone three is clear of vehicles and the second vehicle is positioned behind the first vehicle, by retracting the vehicle stop from the front of the first vehicle and holding the second vehicle in position,
thereafter releasing the second vehicle and reinserting the air blocking vehicle stop into the conduit and moving the second vehicle to the downstream end of zone two, and
exhausting air from the conduit adjacent zone one for controlling the movement of vehicles through the conduit.

8. The method of claim 7 including exhausting air from the conduit adjacent both the upstream end and the downstream end of zone one for controlling the time of movement of vehicles from zone one into zone two.

9. The method of claim 7 including the step of adding the movement of the first vehicle from zone two into zone three by the actuating of an accelerator to push the first vehicle out of zone two.

10. The method of claim 7 including the step of moving vehicles from zone one to zone two at a time rate only slightly smaller than the time rate of movement from zne two to zone three for minimizing impact forces between vehicles.

11. An apparatus for processing vehicles which are moved through a conduit by air comprising,
said conduit including zones one, two and three in sequence from an upstream portion to a downstream portion of the conduit,
an air blocking vehicle stop movable into and out of the conduit at the downstream end of zone two for stopping a vehicle at the downstream end of zone two and releasing a vehicle to zone three,
a vehicle holding arm position upstream of the vehicle stop and movable into and out of the conduit in zone two and alternately with the vehicle stop for holding additional vehicles when the stop releases a vehicle to zone three, and releasing a vehicle towards the vehicle stop,
vehicle position sensing means positioned in zones two and three for sensing the presence or absence of two vehicles in zone two and vehicles in zone three and controlling the actuation of the vehicle stop and vehicle holding arm.

12. The apparatus of claim 11 including,
air vent means connected to the conduit adjacent zone one for controlling the movement of vehicles through the conduit.

13. The apparatus of claim 11 including,
said zones being inclined downwardly towards downstream.

14. The apparatus of claim 11 including,
air vent means connected to the conduit adjacent both the upstream end and the downstream end of zone one for controlling the time of movement of vehicles from zone one into zone two.

15. The apparatus of claim 11 including,
vehicle accelerator means positioned in zone two upstream of the vehicle stop for pushing a vehicle from zone two to zone three.

16. An apparatus for processing vehicles which are moved through a conduit by air comprising,
said conduit including zones one, two and three in sequence from an upstream portion towards a downstream portion of the conduit, said zones being inclined downwardly towards downstream for aiding the movement of vehicle downstream by gravity,
an air blocking vehicle stop movable into and out of the conduit at the downstream end of zone two for stopping a vehicle at the downstream end of zone two and releasing a vehicle to zone three,
a vehicle holding arm positioned upstream of the vehicle stop and movable into and out of the conduit in zone two and alternately with the vehicle stop for holding additional vehicles in zones one and two when the stop releases a vehicle to zone three and feeding a vehicle towards the vehicle stop,
vehicle position sensing means positioned in zones two and three for sensing the presence or absence of two vehicles in zone two and vehicles in zone three and controlling the actuation of the vehicle stop and vehicle holding arm, and
air vent means adjacent the upstream end of zone one.

17. The apparatus of claim 16 including air vent means connected to the conduit adjacent the downstream end of zone one for controlling the time of movement of vehicles from zone one into zone two.

18. The apparatus of claim 16 including,
vehicle accelerator means positioned in zone two for movement into and out of the conduit for pushing a vehicle from zone two to zone three.

19. The apparatus of claim 16 including,
a vehicle position sensing means positioned in zone one downstream of the vent means for controlling the maximum number of vehicles present in zone one.

* * * * *